United States Patent
Juuti et al.

(10) Patent No.: US 9,255,844 B2
(45) Date of Patent: Feb. 9, 2016

(54) SYSTEM AND METHOD FOR OPTICAL MEASUREMENT OF A TARGET AT MULTIPLE POSITIONS

(71) Applicant: Teknologian tutkimuskeskus VTT, Vtt (FI)

(72) Inventors: Mikko Juuti, Kuopio (FI); Heikki Saari, Espoo (FI); Heimo Keranen, Espoo (FI); Jouko Malinen, Oulu (FI)

(73) Assignee: TEKNOLOGIAN TUTKIMUSKESKUS VTT, Vtt (FI)

( * ) Notice: Subject to any disclaimer, the term of this patent is extended or adjusted under 35 U.S.C. 154(b) by 0 days.

(21) Appl. No.: 14/024,832

(22) Filed: Sep. 12, 2013

(65) Prior Publication Data

US 2014/0071451 A1    Mar. 13, 2014

(30) Foreign Application Priority Data

Sep. 12, 2012   (FI) .................... 20125944

(51) Int. Cl.
| | |
|---|---|
| G01J 3/45 | (2006.01) |
| G01B 9/02 | (2006.01) |
| G01J 3/51 | (2006.01) |
| G01J 3/02 | (2006.01) |
| G01J 3/10 | (2006.01) |
| G01J 3/26 | (2006.01) |
| G01J 3/28 | (2006.01) |
| G01J 3/32 | (2006.01) |
| G01J 3/36 | (2006.01) |

(52) U.S. Cl.
CPC .............. *G01J 3/51* (2013.01); *G01J 3/0218* (2013.01); *G01J 3/0294* (2013.01); *G01J 3/10* (2013.01); *G01J 3/26* (2013.01); *G01J 3/2803* (2013.01); *G01J 3/32* (2013.01); *G01J 3/36* (2013.01)

(58) Field of Classification Search
CPC ..... G01J 3/0218; G01J 3/0221; G01J 3/0294; G01J 3/10; G01J 3/26; G01J 3/2803; G01J 3/36; G01J 3/45; G01J 3/51
See application file for complete search history.

(56) References Cited

U.S. PATENT DOCUMENTS

| | | | | |
|---|---|---|---|---|
| 5,210,590 | A * | 5/1993 | Landa | G01J 3/02 356/319 |
| 5,455,673 | A * | 10/1995 | Alsmeyer | G01J 3/44 356/301 |
| 6,411,835 | B1 * | 6/2002 | Modell | A61B 1/00059 250/461.2 |
| 7,869,034 | B2 * | 1/2011 | Wang et al. | 356/326 |
| 8,130,380 | B2 | 3/2012 | Saari | |
| 2003/0227628 | A1 * | 12/2003 | Kreimer et al. | 356/419 |
| 2006/0124840 | A1 * | 6/2006 | Ida et al. | 250/226 |
| 2010/0097613 | A1 * | 4/2010 | Saari | 356/454 |
| 2010/0284005 | A1 * | 11/2010 | Malinen | G01J 3/02 356/326 |
| 2013/0155402 | A1 * | 6/2013 | Walton et al. | 356/301 |

FOREIGN PATENT DOCUMENTS

| | | |
|---|---|---|
| FI | 119830 | 3/2009 |
| GB | 2445956 | 7/2008 |

\* cited by examiner

*Primary Examiner* — Michael A Lyons
(74) *Attorney, Agent, or Firm* — Young & Thompson

(57) ABSTRACT

The invention relates to a system and a method for optical measurement of a target, wherein the target is illuminated, either actively illuminated, reflecting ambient light, or self illuminating, and a measurement radiation beam received from the target or through it is detected. The measurement system has optical fibers for guiding radiation from/to target positions. Radiation of several target positions is simultaneously filtered by a Fabry-Perot interferometer and detected by a row detector, for example.

7 Claims, 1 Drawing Sheet

SYSTEM AND METHOD FOR OPTICAL MEASUREMENT OF A TARGET AT MULTIPLE POSITIONS

TECHNICAL FIELD

The invention relates to a system and a method for optical measurement of a target at multiple positions, wherein the target is either actively illuminated, reflecting ambient light, or self illuminating, and a measurement light beam received from the target or through the target is detected.

BACKGROUND TECHNOLOGY

Optical measurement systems are used for e.g. analysing properties or material contents of a target. Such optical measurement systems typically measure absorbance, reflection or emission of a target. The measurement systems usually have filters in order to facilitate the measurements with specified radiation wavelengths. Such filters can be controllable Fabry-Perot interferometers, for example.

It is often necessary to provide measurements of a target with two or more wavelengths. When such measurements are made successively the measurement tends to take a long time. Document FI119830B1 discloses a system for optical measurement where radiation of several wavelengths is measured simultaneously. This system requires a radiation detector which has detector elements with different spectral sensitivities. Document GB2445956A discloses another measurement system where several wavelengths can be measured simultaneously. Radiation sources of different wavelengths are modulated, and the detected radiation is demodulated in order to separate the signals that correspond to the different wavelengths.

It is often also necessary to measure a large number of samples, especially in the field of pharmaceutical testing. This is usually done by providing the measurements for one sample at a time, and changing the sample under measurement by moving a sample tray. This way, however, providing the measurements for a large number of samples takes a long time. It is possible to use an image detector and measure several samples simultaneously. However, such image detectors which qualify for accurate optical measurements are expensive. Especially, suitable low-cost image detectors for measuring radiation of long wavelengths such as NIR need to be measured.

SUMMARY OF THE INVENTION

The purpose of the present invention is to avoid or reduce disadvantages of the prior art. The objective of the invention is therefore to provide an optical measurement system for optical measurement of one or several targets at multiple positions in an efficient and cost-effective manner.

The objective of the invention is achieved with a solution, in which radiation of a target at multiple positions is guided with light guides to a detector with several detector elements. One light guide is preferably used for guiding radiation from one position of a target to one detector element of the detector.

The inventive measurement system allows measuring one target position with one detector element, and the number of required detector elements is thus small. Suitable line detectors, for example, are inexpensive to manufacture, and they are available for measurements with long radiation wavelengths such as NIR.

When a controllable Fabry-Perot interferometer is used as a filter, it is possible to select the measurement wavelength as required. The Fabry-Perot interferometer can be used for filtering the radiation received from the target, whereby the Fabry-Perot interferometer is located between the light guide and the detector, or the Fabry-Perot interferometer can also be used for filtering radiation of a radiation source. It is also possible to use two Fabry-Perot interferometers which allow the selection of the illumination or measurement wavelength in a larger wavelength range than with a single Fabry-Perot interferometer.

System according to the invention for optical measurement of a target at several positions comprises a detector for receiving measurement radiation beam from or through the target, and optionally a radiation source for illuminating the target with an illuminating radiation beam, and the system comprises at least one first Fabry-Perot interferometer within the path of the measurement radiation beam and optionally a further Fabry-Perot interferometer within the path of the illuminating radiation beam, wherein the system comprises optical fibres for guiding radiation from several positions of the target(s) to the detector, the first Fabry-Perot interferometer being located between the optical fibres and the detector in order to simultaneously filter radiation received from several positions of the target via several optical fibres, the detector is a row detector which has several adjacent detector elements in line, each of the optical fibres guide radiation from one determined position of the target to one determined detector element of the detector, a plurality of the optical fibres are connected at their ends to a common slit which directs the measurement radiation beams from the ends of the fibres through the first Fabry-Perot interferometer to the detector elements.

Some preferable embodiments of the invention are described in the dependent claims.

According to one embodiment the system comprises a Fabry-Perot interferometer between the optical fibres receiving radiation from the target and the detector in order to simultaneously filter radiation received from several positions of the target via several optical fibres.

in another embodiment of the invention the system comprises a radiation source, and second optical fibres for guiding radiation from the radiation source to several determined positions of the target.

In a further embodiment of the invention the system comprises a Fabry-Perot interferometer between the radiation source and the second optical fibres for filtering radiation illuminating several positions of the target.

In one further embodiment the system comprises means for splitting radiation received from the target position into first and second radiation beams, wherein the system comprises a first Fabry-Perot interferometer and a first detector for measuring a first spectral component of the first radiation beam, and the system comprises a second Fabry-Perot interferometer and a second detector for measuring a second spectral component of the second radiation beam. According to a further embodiment, the means for forming first and second radiation beams is a beam splitter.

Significant advantages can be achieved with the invention when compared to the known solutions. It is possible to achieve simultaneous measurements from multiple positions of a target, and it is possible to measure more than one wavelength component simultaneously. It is therefore possible to achieve efficient multipoint measurement. However, the inventive solution can be implemented with low-cost detectors, such as row detectors. No individual detectors are needed as the measurement beams can be detected with a single row detector which has several detector elements in line. The inventive measurement system can also be used for measuring radiation of long wavelengths such as NIR as suitable row detectors are available. A common slit, common Fabry-Perot interferometer and common row detector can be used for all fibres of the measurement radiation. Individual lenses for each fibre or each detector are not necessarily needed between the fibres and the detector elements as the radiation may be directly coupled between the fibre ends and the Fabry-Perot interferometer and between the Fabry-Perot interferometer and detector elements. This way the system can be made small in size, and the production is simple and can be automated. Low production cost can thus be achieved.

In this patent application the term "Fabry-Perot interferometer" means a component with at least two reflecting surfaces which cause an interference effect when illuminated with radiation. The pass band of a Fabry-Perot interferometer is preferably electrically controllable. The pass band may relate to transmitted and/or reflected radiation of a Fabry-Perot interferometer.

In this patent application the terms "illumination", "radiation" or "light" are used to mean any radiation in the optical range of wavelengths.

In this patent application the term "target" is used to mean an object, from which radiation is measured simultaneously in several positions. A set of samples, for example may be a target.

SHORT DESCRIPTION OF THE DRAWINGS

In the following part the preferable exemplary embodiments of the invention are described in more detail by referring to the enclosed drawings, in which.

DETAILED DESCRIPTION OF EMBODIMENTS

Figure 1:
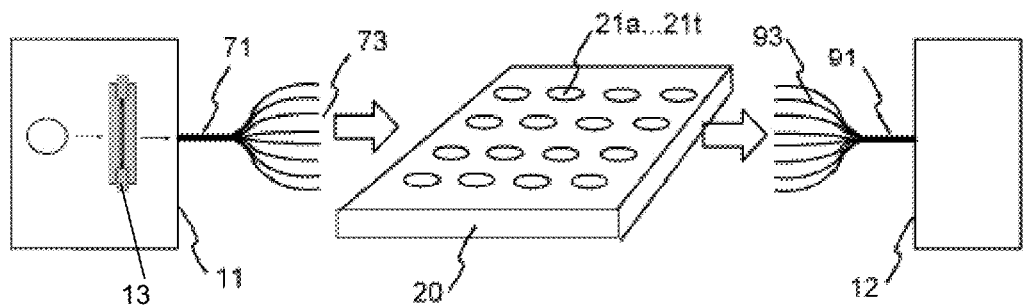
FIG. 1 illustrates an embodiment of the measurement system according to the invention as a block diagram.

FIG. 1 illustrates a general block diagram for an embodiment of the measurement system according to the invention. The system has an illuminating part 11 for providing illumination for the target. The illuminating part has a suitable radiation source, and the radiation is directed to the first ends of the illuminating optical fibres of the optical fibre bundle 71. An initial Fabry-Perot interferometer is provided within the path of the illuminating radiation beam between the radiation source and the optical fibre bundle 71. The second ends of the optical fibres are positioned close to the measurement target 20 so that the end of each optical fibre is close to a determined measurement position 21a . . . 21t of the target. The target of FIG. 1 has 20 measurement positions, such as samples, and thus the optical fibre bundle has 20 optical fibres for illuminating each target position. However, it is also possible that two or more optical fibres are used to guide illumination to each target position.

The measurement system also has a bundle of optical fibres for receiving radiation from the sample positions. The first ends 93 of the optical fibres are positioned close to the measurement target 20 so that the end of each optical fibre is close to a determined measurement position 21a . . . 21t of the target. There is thus at least one optical fibre for illumination of each measurement position to be measured simultaneously, and at least one optical fibre for reception of radiation. However, it is also possible to use ambient illumination or to measure radiation produced by the target, and in this case the optical fibres are not used for illumination of the target.

The optical fibres that receive the radiation from the target are led to detection part of the system. The detection part preferably has one or two Fabry-Perot interferometers for filtering and scanning the received radiation, which is the detected by one or two detectors. However, in addition or alternatively it is possible that the illumination radiation is filtered by a Fabry-Perot interferometer located in the illuminating part.

Additionally, the measurement system has a processing part (not shown) for processing the data received from the detectors.

Figure 2:
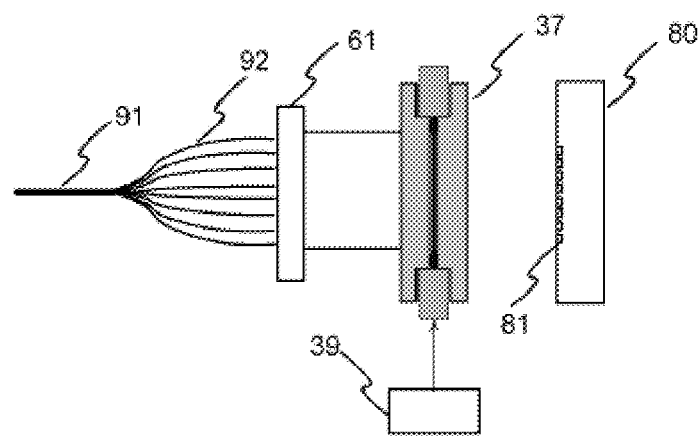
FIG. 2 illustrates an exemplary detection part of the measurement system according to the invention, in which the detection part has one Fabry-Perot interferometer and one detector.

FIG. 2 illustrates an exemplary detection part of a measurement system according to the invention. The ends 92 of the optical fibre bundle 91 are connected to an entrance slit, which is common to the ends of all the fibres of the bundle. The slit directs the measurement radiation from the fibre ends to from which the radiation is led to a Fabry-Perot interferometer 37. This detection part has one Fabry-Perot interferometer which filters the received radiation, after which the filtered radiation enters the detector 80. The detector is a row detector with several detector elements 81 in line, and preferably radiation from each optical fibre (and target position) is led to a corresponding detector element. Thus the number of simultaneously measured measurement positions, number of optical fibres of the reception bundle as well as number of detector elements are preferably equal. However, it is also possible that there are two or more optical fibres for guiding radiation received from each measurement position.

The Fabry-Perot interferometer is preferably controlled by a controller 39 in such a way that a suitable range of wavelengths of the received radiation is scanned.

Figure 3:
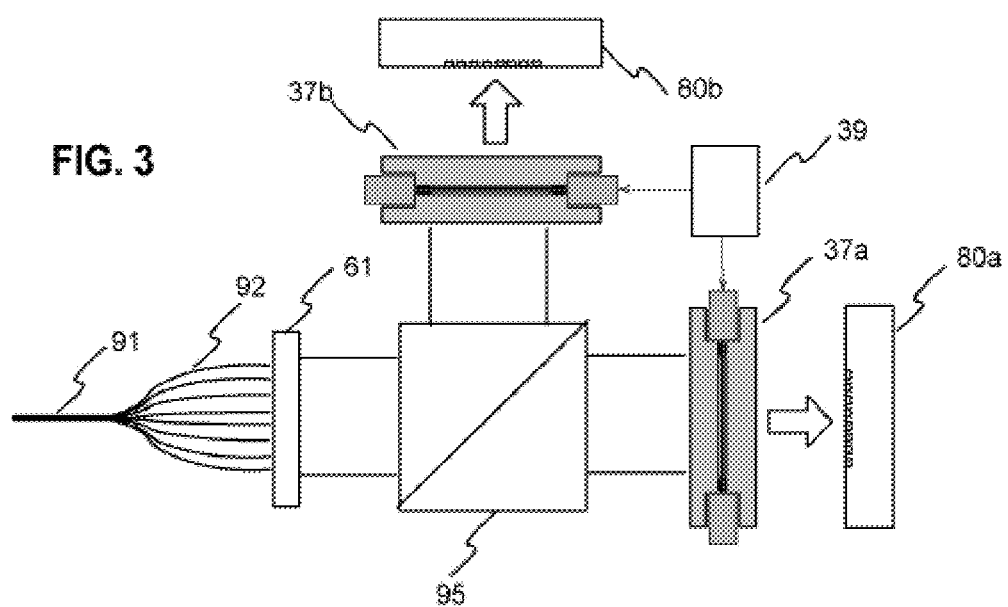
FIG. 3 illustrates another exemplary detection part of the measurement system according to the invention, in which the detection part has two Fabry-Perot interferometers and two detectors.

FIG. 3 illustrates another example of a detection part according to the invention. This detection part has a beam splitter 95 for splitting the received radiation into two radiation beams. The detection part has two Fabry-Perot interferometers 37a and 37b for filtering radiation, and the filtered radiation is led to corresponding two detectors 80a, 80b. With this structure it is possible to measure two wavelength components of the received radiation simultaneously.

Instead of using a beam splitter, it is possible to provide separate radiation beams from a target position by using separate optical fibres or optical fibre dividers, for example.

An optical measurement system commonly includes processing means for performing the optical measurement process. The control of the measuring process in an optical measurement instrument generally takes place in an arrangement of processing capacity in the form of microprocessor(s), and memory in the form of memory circuits. Such arrangements are known as such from the technology of analyzers and relating equipment. To convert a known optical instrument into equipment according to the invention it may be necessary, in addition to the hardware modifications, to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art.

The invention has been described with the reference to the enclosed embodiments. It is, however, clear that the invention is not restricted only to those, but is comprises all embodiments which can be imagined within the inventive idea and the enclosed patent claims.

For example, the applications and targets of the described embodiments are exemplary and only serve to assist in understanding the functionality of the embodiments. It is, however clear that each embodiment can be used for measuring different types of targets. Also, measurement of e.g. transmittance, reflectance or fluorescence is possible with each of the described embodiments. It is also possible to provide measurements where the illumination is received from the ambient, such as the sun, or where the measurement radiation originates from the target as in the case of thermal radiation or chemiluminescence.

The invention claimed is:

1. A system for optical measurement of a target at several positions, the system comprising:
    at least one detector configured to receive a measurement radiation beam from or through the target;
    at least one Fabry-Perot interferometer within the path of the measurement radiation beam; and
        first optical fibers configured to guide radiation from several positions of the target to the at least one detector, the at least one Fabry-Perot interferometer being located between the optical fibers and the at least one detector in order to simultaneously filter radiation received from the several positions of the target via several optical fibers,
    wherein the at least one detector is a row detector which has several adjacent detector elements in line,
    each of the optical fibers guide radiation from one determined position of the target to one determined detector element of the at least one detector, and
    a plurality of the optical fibers are connected at ends thereof to a common slit which directs the measurement radiation beams from the ends of the fibers through the at least one Fabry-Perot interferometer to the detector elements.

2. The system according to claim 1, further comprising:
    a radiation source; and
    second optical fibers configured to guide radiation from the radiation source to several positions of the target.

3. The system according to claim 2, further comprising an additional Fabry-Perot interferometer between the radiation source and the second optical fibers, the additional Fabry-Perot interferometer being configured to filter radiation illuminating the several positions of the target.

4. The system according to claim 1, further comprising means for providing radiation received from the target position into first and second radiation beams,
    wherein the at least one Fabry-Perot interferometer includes a first Fabry-Perot interferometer and a second Fabry-Perot interferometer, and the at least one detector includes a first detector and a second detector,
    the first Fabry-Perot interferometer and the first detector measure a first spectral component of the first radiation beam, and
    the second Fabry-Perot interferometer and the second detector measure a second spectral component of the second radiation beam.

5. The system according to claim 4, wherein said means for providing first and second radiation beams from one target position is a beam splitter.

6. The system according to claim 1, further comprising a radiation source configured to illuminate the target with an illuminating radiation beam.

7. The system according to claim 6, further comprising an additional Fabry-Perot interferometer within the path of the illuminating radiation beam.

* * * * *